(No Model.)
J. A. KIENARDT.
CARPET STRETCHER.
No. 377,309. Patented Jan. 31, 1888.
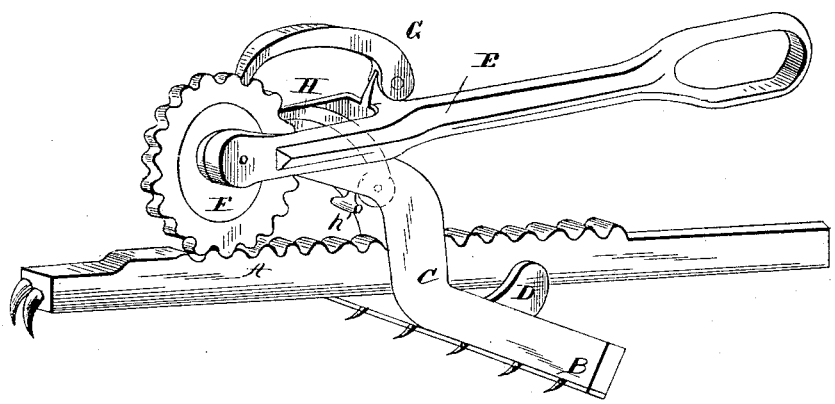
WITNESSES
F. L. Ourand
Geo. C. Poulton
INVENTOR
John A. Kienardt.
Phil. T. South Attorney.

UNITED STATES PATENT OFFICE.

JOHN A. KIENARDT, OF DAYTON, OHIO, ASSIGNOR OF ONE-HALF TO PHILIP T. SOUTH, OF SAME PLACE.

CARPET-STRETCHER.

SPECIFICATION forming part of Letters Patent No. 377,309, dated January 31, 1888.

Application filed August 3, 1887. Serial No. 246,017. (No model.)

*To all whom it may concern:*

Be it known that I, JOHN A. KIENARDT, a citizen of the United States, residing at Dayton, in the county of Montgomery and State of Ohio, have invented a new and useful Carpet-Stretcher, of which the following is a specification.

My invention is a carpet-stretcher; and it consists of the peculiar construction and combination of parts, hereinafter fully described, and pointed out in the claim.

The figure illustrated in the accompanying drawing is a perspective view of my carpet-stretcher complete.

The letters in the drawing are particularly pointed out in the specification.

A is a bar or rack with angular teeth on its upper side.

B is a cross-head provided on its under side with sharpened teeth.

C are the arms, which are made fast to the front side of the rake, extending forward with an upward curve.

D are guides immediately behind the arms and upon the opposite side of the rake.

E is a bifurcated lever.

F is a cog-wheel.

G and H are pawls.

At the forward end of the bar or rack A teeth $a$ $a'$ are inserted for the purpose of holding the rack in place during the operation of stretching the carpet. These teeth are driven into the floor, and the bar is placed through the guides over the top of the rake and through the opening formed by the arms C. When in this position, the stretcher is ready for use by simply raising the lever. The pawl G, working in the cog-wheel F, pushes the wheel forward, which operates in the cogs of the rack A, while the teeth in the cross-head B take hold of the carpet, pulling it toward the place or point to be tacked. As the lever goes forward, the smaller pawl, H, which is pivoted to the arms C, working below and underneath the lever, falls into the cog and acts as a ratchet, holding the carpet in place until tacked to the floor.

The pawl H is provided with an arm, $h$, at its lower end, which comes in contact with the under surfaces of the arms C. When the pawl H is in operation, said arm $h$ holds the said pawl into engagement with the wheel F, whereby disengagement of the pawl H is prevented.

I am aware of patents numbered 10,143 and 187,544, and I do not claim such devices, broadly.

Having thus described my invention, what I desire to secure by Letters Patent is—

A carpet-stretcher consisting of the toothed cross-head B, having arms C and guides D, the rack-bar A, interposed between the said arms and guides, the toothed wheel F, pivoted to the outer ends of the arms C, the lever E, having bifurcated arms journaled on the outer faces of the arms C, and having a pawl, G, automatically engaging the wheel F, and said arms C having the pivoted pawl H, also engaging said wheel F, the said pawl G also provided with an arm, $h$, operating under the arms C, as shown and described, and for the purpose set forth.

JOHN A. KIENARDT.

Attest:
   G. A. PARKER,
   P. THOMAS.